(12) United States Patent
Caracas et al.

(10) Patent No.: US 8,559,464 B2
(45) Date of Patent: Oct. 15, 2013

(54) SYNCHRONIZING NODES OF A MULTI-HOP NETWORK

(75) Inventors: Alexandru Caracas, Zurich (CH); Urs Hunkeler, Vogelsang-Turgi (CH); Hong Linh Truong, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 13/088,527

(22) Filed: Apr. 18, 2011

(65) Prior Publication Data

US 2011/0268139 A1  Nov. 3, 2011

(30) Foreign Application Priority Data

Apr. 30, 2010 (EP) ..................................... 10161619

(51) Int. Cl.
*H04J 3/06* (2006.01)
(52) U.S. Cl.
USPC ......................................................... 370/503
(58) Field of Classification Search
USPC ......... 370/337, 210, 256, 336, 229, 442, 321, 370/347, 329, 254, 230, 328, 330, 503; 455/436, 445
See application file for complete search history.

(56) References Cited

U.S. PATENT DOCUMENTS

| | | | | |
|---|---|---|---|---|
| 5,613,198 A * | 3/1997 | Ahmadi et al. | ................ | 370/337 |
| 6,741,551 B1 * | 5/2004 | Cherubini | ..................... | 370/210 |
| 7,349,362 B2 * | 3/2008 | Belcea | .......................... | 370/321 |
| 8,265,045 B2 * | 9/2012 | In et al. | ........................... | 370/337 |
| 8,391,217 B2 * | 3/2013 | Cleveland et al. | ............. | 370/329 |
| 2005/0135275 A1 * | 6/2005 | Hester et al. | .................... | 370/256 |
| 2005/0249167 A1 * | 11/2005 | Salokannel | ..................... | 370/336 |
| 2006/0025136 A1 * | 2/2006 | Fujita et al. | .................... | 455/436 |
| 2007/0060143 A1 * | 3/2007 | Bhatti | ............................ | 455/445 |
| 2007/0091797 A1 * | 4/2007 | Ma et al. | ........................ | 370/229 |
| 2007/0230497 A1 * | 10/2007 | Choi et al. | ...................... | 370/442 |
| 2008/0232334 A1 * | 9/2008 | Das et al. | ....................... | 370/337 |
| 2008/0304469 A1 * | 12/2008 | Dorion | .......................... | 370/347 |
| 2010/0034159 A1 * | 2/2010 | Shin et al. | ...................... | 370/329 |
| 2010/0110888 A1 * | 5/2010 | Park et al. | ...................... | 370/230 |
| 2010/0118737 A1 * | 5/2010 | Kim et al. | ...................... | 370/254 |
| 2010/0124209 A1 * | 5/2010 | In et al. | ........................... | 370/337 |
| 2010/0177684 A1 * | 7/2010 | Kore et al. | ...................... | 370/328 |
| 2011/0038343 A1 * | 2/2011 | Bhatti et al. | ................... | 370/330 |

OTHER PUBLICATIONS

N. Burri, P. von Rickenbach, R. Wattenhofer, "Dozer: Ultra-Low Power Data Gathering in Sensor Networks", IPSN'07, Apr. 25-27, 2007.

(Continued)

*Primary Examiner* — Asad Nawaz
*Assistant Examiner* — Parth Patel
(74) *Attorney, Agent, or Firm* — Vazken Alexanian

(57) ABSTRACT

A method for synchronizing nodes of a multi-hop network with a Time Division Multiplex Access scheme (TDMA), the nodes being hierarchically arranged in different levels, including a step of organizing the TDMA by periodic superframes, the respective superframe having a number of frames including at least a broadcast frame, a step of providing the respective broadcast frame with a number of slots, the number of slots being equal to a number of parent nodes in the multi-hop network, a step of assigning each parent node one slot in the broadcast frame in dependence on its level, and a step of distributing a synchronization information to the parent nodes by means of the broadcast frame, respectively.

24 Claims, 5 Drawing Sheets

(56) References Cited

OTHER PUBLICATIONS

I. Rhee et al., "Z-MAC: A Hybrid MAC for Wireless Sensor Networks", IEEE/ACM Transactions on Networking, vol. 16, No. 3, Jun. 2008.

S.C. Ergen, P. Varaija, "PEDAMACS: Power Efficient and Delay Aware Medium Access Protocol for Sensor Networks", IEEE Transactions on Mobile Computing, vol. 5, No. 7, Jul. 2006.

K. Pister, L. Doherty, "TSMP: Time Synchronized Mesh Protocol", Proceedings IASTED International Symposium on Distributed Sensor Networks (DSN 2008), Nov. 16-18, 2008, Orlando.

\* cited by examiner

SYNCHRONIZING NODES OF A MULTI-HOP NETWORK

CROSS-REFERENCE TO RELATED APPLICATION

This application claims priority under 35 U.S.C. §119 from Switzerland Patent Application No. 10161619.1 filed Apr. 30, 2010, the entire contents of which are incorporated herein by reference.

BACKGROUND OF THE INVENTION

The invention relates to synchronizing nodes of a multi-hop network with a Time Division Multiplex Access (TDMA) scheme, in particular a TDMA-based low-power sensor network.

In a low-power sensor network, in particular in a battery-operated wireless sensor network, it can be important to switch off the radio transceivers of the sensor nodes during their idle periods to save energy. Idle periods are time periods in which the nodes have nothing to send or to receive. A further aspect is to avoid collisions when transmitting messages or overhearing when receiving messages that are not destined to the respective node.

In such a context, TDMA-based systems are inherently energy-efficient because the nodes of the system need to turn on their radio transceiver only during their own time slots. In all other time slots, the respective node can turn off its radio transceiver. By means of an appropriate time slot assignment, it is possible to wake up senders and receivers at the same time slot so that they can exchange the messages over the network.

Many-to-one communication, as in a multi-hop network, is a very common requirement of sensor network applications, e.g. in the field of environmental monitoring or data gathering, in which the sensor nodes exchange information with a sink node generally not between themselves. In this regard, the sensor nodes generate periodic data samples and send these generated periodic data samples to the sink node for further processing. The opposite direction from the sink node to the other sensor nodes can be also used, e.g. for sending control information from the sink node to the other nodes. The routes or branches between the sink node and the further sensor nodes can build a multi-hop tree routed at the sink node and spanned over all the nodes.

In the reference N. Burri, P. von Rickenbach, R. Wattenhofer, "Dozer: Ultra-Low Power Data Gathering in Sensor Networks", IPSN'07, Apr. 25-27, 2007, also referred to as "Dozer", a TDMA protocol is described which is based on a local, single-hop schedule without any central or global synchronization. Each parent node in Dozer has its own schedule and can start a TDMA round with the transmission of a beacon message. Children nodes in Dozer synchronize with their parent nodes on receiving their parent's beacon. A short contention access phase follows the beacon, during which child nodes can send a connection request to the parent node. Every connected child node is assigned a time slot in the TDMA phase and uses this slot to send its data to its parent node.

Since the TDMA schedule is performed locally, collisions between nodes belonging to different schedules cannot be excluded totally. To reduce the probability for such a collision, the length of a TDMA round is extended randomly in Dozer. The respective parent node adds a random time span to each TDMA round and includes this information into the starting beacon message. As a result, its child nodes can calculate the time when the next beacon message will be sent.

Dozer is mainly designed for the unidirectional transfer of data towards the sink node. Commands sent in the opposite direction are piggybacked into the beacons and, therefore, broadcasted into the whole network.

Further, in the reference I. Rhee et al., "Z-MAC: A Hybrid MAC for Wireless Sensor Networks", IEEE/ACM Transactions on Networking, vol 16, no 3, June 2008, also referred to as "Z-MAC", time is divided into periodic frames with a fixed number of slots. A distributed slot assignment algorithm is performed at a deployment time to assign the slots to the nodes. A node can transmit during any time slot using Carrier Sense Multiple Access (CSMA), wherein a slot's owner has a higher access priority than a non-owner. Nodes in Z-MAC can use B-MAC Low Power In the reference V. Rajendran, J. J. Garcia-Luna-Aveces, K. Obraczka, "Energy-Efficient, Application-Aware Medium Access for Sensor Networks", IEEE International Conference On Mobile Adhoc and Sensor Systems, November 2005, also referred to as "FLAMA", time is divided into periods of random-access and schedule-access intervals. The random-access interval is used for time synchronization, exchanging neighbor information, and routing tree information. This interval can be long enough to cope with collisions and re-transmissions. The scheduled access interval is time-slotted. FLAMA uses a distributed election mechanism to schedule collision-free transmissions. The election algorithm is limited due to the limited resources of the sensor nodes. As a result, parent nodes have to listen to all slots to determine whether there is any transmission and can go to sleep only if they do not receive data for a certain time.

In the reference S. C. Ergen, P. Varaija, "PEDAMACS: Power Efficient and Delay Aware Medium Access Protocol for Sensor Networks", IEEE Transactions on Mobile Computing, vol 5, no 7, July 2006, also referred to as "PEDAMACS", time is divided into so-called phases. A phase is started by a corresponding coordination packet broadcasted by the sink node of the network. It is assumed that the broadcasted coordination packet can reach all nodes in the network, while a packet sent by a node can need multiple hops to reach the sink node. PEDAMACS operates with the following four phases described below.

The first phase is a topology-learning phase. During this topology-learning phase, the sink node floods the network with a tree construction packet, which is retransmitted by the nodes using CSMA. At the end of this topology-learning phase, all nodes should have determined their neighbors and interferers with high probability.

The second phase is a topology-collection phase. This phase follows the topology-learning phase. During this topology-collection phase, the nodes use CSMA to send their local topology information collected at the former phase to the sink. At the end of this topology-collection phase, the sink node should have the complete topology of the network.

The third phase is a scheduling phase. This scheduling phase is time-slotted. Based on the collected topology information, the sink node computes the TDMA schedule for all nodes and broadcasts this information within the coordination packet, which announces the beginning of this phase. The nodes can use the broadcasted schedule information to decide on sending, receiving, or sleeping. The schedule algorithm ensures that all data packets created in the sensor nodes reach the sink node at the end of this phase.

The fourth phase is an adjustment phase. This adjustment phase is used by the nodes to detect local topology changes. The changes are reported to the sink node by embedding the information in the data packets sent during the scheduling phase. Then, the sink node can update the routing paths or correct the schedule, if necessary.

Moreover, in the reference K. Pister, L. Doherty, "TSMP: Time Synchronized Mesh Protocol", Proceedings IASTED International Symposium on Distributed Sensor Networks (DSN 2008), Nov. 16-18 2008, Orlando, Fla., USA, also referred to as "TSMP", a MAC protocol of the wireless HART standard is described, which is used in industrial automation. TSMP uses a network-wide time synchronization not only to divide time into slots, but also to coordinate switching between multiple channels, in particular between multiple frequency channels.

In TSMP, time is divided into slots of 10 ms duration, wherein a slot can span over multiple channels. The result is a matrix of cells. A superframe is a collection of cells repeating at a constant rate. Events are scheduled to happen in individual cells, and the superframe length is configured in such a way that the network can support these events.

TSMP is a centralized architecture in the sense that both routing and time scheduling are performed by a central network manager and distributed to the nodes.

With regard to reference TSMP, TSMP allows two options for synchronization or sync updates. The first is a child-initiated unicast request for a time update through an acknowledgement called a keepalive. The second is a parent-initiated broadcast update, commonly known as a beacon. In a network with regular data-reporting to a time-master access point (AP), nodes close to the AP can see traffic much more often than every synchronization interval Tsync. These nodes track the AP's clock with no additional traffic when time sync information is piggybacked on top of data acknowledgements. It is the responsibility of the manager to schedule sufficient links to meet the needs of time sync.

SUMMARY OF THE INVENTION

One aspect of the present invention provides a method for synchronizing nodes of a multi-hop network with a Time Division Multiplex Access (TDMA) scheme in which the nodes are arranged in different levels. The method includes the steps of: organizing the TDMA by periodic superframes in which the respective superframes have a number of frames including at least a broadcast frame; providing the respective broadcast frame with a number of slots that are equal to a number of parent nodes in the multi-hop network; assigning each parent node one slot in the broadcast frame depending on its level; and respectively distributing synchronization information to the nodes by the broadcast frame.

Another aspect of the present invention provides a computer readable storage medium tangibly embodying a computer readable program code having computer readable instructions which, when implemented, cause a computer to carry out the steps of the above method.

Another aspect of the present invention provides a device for synchronizing nodes of a multi-hop network with a Time Division Multiplex Access (TDMA) in which the nodes are arranged in different levels. The device includes: a first means, such as, a scheduler for organizing the TDMA by periodic superframes the respective superframe having a number of frames including at least a broadcast frame; a second means, such as, a provider, for providing the respective broadcast frame with a number of slots, wherein the number of slots are equal to a number of parent nodes in the multi-hop network; a third means, such as, a processor, for assigning each parent node one slot in the broadcast frame depending on its level; and a fourth means, such as, a synchronizer, for respectively distributing synchronization information to the nodes by the broadcast frame.

Any of the above-described means (first means, second means, third means, and fourth means) can be implemented in hardware or in software. If the means are implemented in hardware, it can be embodied as a device, such as, a computer or as a processor, or as a part of a system, such as, a computer-system. If the means are implemented in software, it can be embodied as a computer program product, as a function, as a routine, as a program code or as an executable object.

DETAILED DESCRIPTION OF PREFERRED EMBODIMENTS

Figure 1:
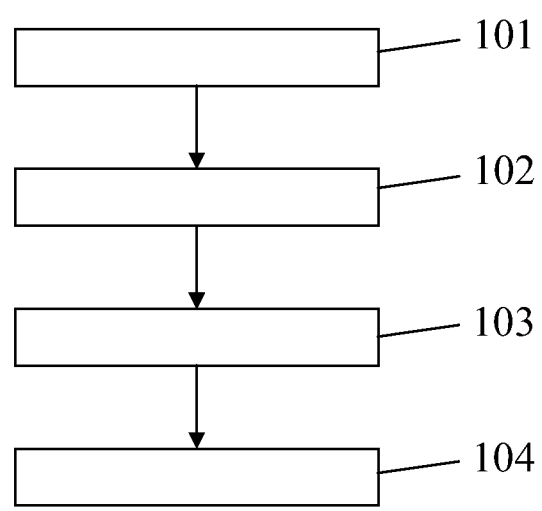
FIG. 1 shows an embodiment of a sequence of method steps for synchronizing nodes of a TDMA-based multi-hop network.

Embodiments of the present invention can be adapted to a TDMA-based multi-hop network. The nodes of the multi-hop network can be arranged in different levels.

A TDMA superframe structure according to embodiments of the present invention for synchronizing the nodes of a multi-hop network can be energy-efficient, because it allows the nodes of the multi-hop network to be awake only during the duration of the time slots assigned to them. In all other times, the transceiver of the respective node can be switched off and can not consume energy. Embodiments of the invention for synchronizing nodes of a multi-hop network can provide a collision-free and overhearing-free solution for regular traffic sent during the broadcast frames.

For example, slots in the broadcast frame can be used to propagate collision-free said synchronization information from the root node to all the nodes in the network. According to an embodiment of the invention, the synchronization information can be transferred as a time sync beacon.

The superframe can consist of a number of frames including at least a broadcast frame. The respective frame, for example the broadcast frame, can consist of multiple time slots of a fixed length. During one slot, a number of messages can be transferred. Further, during a slot, a node can be in one of the following three states or modes: sending, receiving or sleeping (idle). Nodes can be only awake during slots that are assigned to them for sending or receiving.

According to embodiments of the invention each parent node can be assigned to a slot within the broadcast frame and can use this slot to broadcast the messages to its child nodes. These messages can be particularly source-routed so that they are not broadcasted to the whole network, but only forwarded towards their final destination node or nodes. In particular, child nodes can wake up during the broadcast slot of their parents to receive the messages sent by their parents. Particularly, the slots of the broadcast frame can be assigned in such a way that the message sent by the sink node at the beginning of the frame reaches its destination nodes in the network within the duration of said broadcast frame.

In one embodiment, the multi-hop network is provided with one root node, at least one parent node being the parent of at least one child node arranged in a lower level than the parent node and at least one child node.

In a further embodiment, a node having a level N is arranged N hops away from the root node, wherein each parent node is assigned its slot in the broadcast frame in dependence on its level N.

In a further embodiment, the method further includes the following steps:

assigning each parent node $N_i$ a level $L_i$ in the multi-hop network; and assigning each parent node $N_i$ a slot $S_i$ in the broadcast frame in dependence on its level $L_i$, wherein the slots are sequentially arranged in the broadcast frame in dependence on a condition $S_i \le S_j$ for all $L_i(N_i) \le L_j(N_j)$ and all $N_i$.

In a further embodiment, the broadcast frame is arranged at the beginning of the superframe.

In a further embodiment, each parent node is assigned its slot for re-distributing the synchronization information received from its parent node in the multi-hop network.

According to an embodiment of a fourth aspect of the invention, a method for transmitting data to nodes of a multi-hop network with a Time Division Multiplex Access (TDMA) is provided wherein the nodes are hierarchically arranged in different levels. The method includes transmitting synchronization information over the multi-hop network for synchronizing the nodes of the multi-hop network by means of the above mentioned method for synchronizing the nodes of the multi-hop network.

In one embodiment, at least one downtree message is transmitted within at least one slot of the broadcast frame additionally to the synchronization information.

In a further embodiment, the downtree message and the synchronization information are transmitted by means of one single message in the respective slot of the broadcast frame.

In a further embodiment, the downtree message and the synchronization information are transmitted by means of two separate messages in the respective slot of the broadcast frame.

In a further embodiment, at least one downtree message is broadcast to all nodes in the multi-hop network.

In a further embodiment, at least one downtree message is unicasted to one defined receiver node or at least one downtree message is multi-casted to a defined number of receiver nodes, wherein the downtree message is relayed by any intermediate node being arranged between the root node and the respective receiver node.

In a further embodiment, the superframe is additionally provided with a downtree frame in case of a downtree frame request for activating the downtree frame, wherein the downtree frame is configured to transmit at least one downtree message to at least one sink node in the multi-hop network.

In a further embodiment, the downtree frame request for activating the downtree frame is transmitted to the child nodes by means of the assigned slots in the broadcast frame such that one single branch of the multi-hop network is activated.

In a further embodiment, the downtree frame request for activating the downtree frame is transmitted to the child nodes by means of the assigned slots in the broadcast frame such that a plurality of branches of the multi-hop network is activated. In such a case, the downtree frame request can include a list of nodes, which are to be activated during the respective downtree frame.

In a further embodiment, the superframe is additionally provided with an uptree frame in case of an uptree frame request for activating the uptree frame. Similar to the downtree frame, the uptree frame request for activating the uptree frame can be transmitted to the child nodes by means of the assigned slots in the broadcast frame such that one single branch of the multi-hop network is activated.

In a further embodiment, the uptree frame request for activating the uptree frame is transmitted to the child nodes by means of the assigned slots in the broadcast frame such that one single branch of the multi-hop network is activated.

In a further embodiment, the uptree frame request for activating the uptree frame is transmitted to the children nodes by means of the assigned slots in the broadcast frame such that a plurality of branches of the multi-hop network is activated. In such a case, the uptree frame request can include a list of nodes, which are to be activated during the respective uptree frame.

The optional downtree and uptree frames can be used to transfer additional messages from and to the root node. The regular traffic can be transferred during the broadcast and collection frames. Optional frames can then used for exceptional cases, e.g. sending additional messages that cannot be transferred during the broadcast or collection frames. The presence of an optional frame can be indicated by a flag set within the messages sent in the foregoing broadcast or collection frame.

In particular, the downtree frame can be used by a parent node to send additional messages to its child nodes. The parent node can indicate the need for a downtree frame by setting the flag mentioned before in the messages it sends in the broadcast frame. Only child nodes that see the flag set by their parents will then be in receiving mode for the duration of the downtree frame.

Moreover, the uptree frame can be used by a child node to send additional messages to its parent node. Similar to the downtree frame, a child node can request an uptree frame by setting the appropriate flag in the messages it sends to its parent node during the foregoing collection frame. Only parent nodes that see the flag set by one of its children will then be activated for the duration of the uptree frame.

Multiple nodes can send at the same time during the optional frames. Therefore, they can use Carrier-Sense Multiple Access (CSMA) to reduce collisions and interferences.

In a further embodiment, the superframe is additionally provided with a collection frame configured to periodically transmit data to the root node. Slots in the collection frame can be used by the nodes to send their data, in particular periodic data, to the root or sink node. The number of slots assigned to a node depends on the amount of traffic created by their descendant nodes, if any, plus the one created by itself. The length of the collection frame is such that all messages, in particular all periodic messages, created by the nodes can reach the root node within the duration of the collection frame.

Thus, the root node can be the sink for the periodic definite data. For example, if the multi-hop network is embodied by a low-power sensor network, the periodic definite data can be periodic sensor data.

The collection frame can be configured to provide a means for a multi-hop, collision-free, periodic collection of uptree messages, i.e. messages sent from the nodes to the root. The collection frame can be used by the nodes, in particular by the sensor nodes, to send their regular data to the root node, which can be coupled to a base station. The number of slots assigned to a node can depend on the amount of traffic created by their descendant nodes plus the traffic created by itself. The length of the collection frame can be long enough, so that all messages created by the nodes can reach the root node within the duration of the collection frame. A slot assignment algorithm can calculate the total number of slots needed and assign them to the nodes.

Regarding the slot assignment algorithm, it can be assumed that, at the beginning of a collection frame, a node Ni has Mi messages to send to the root node. The algorithm has to distribute the slots of the frame among the nodes such that at the end of the frame all messages have reached the root node.

A scheduling algorithm that fulfills the above requirement can be according to an embodiment of the invention to consider first the nodes at the highest level, i.e. farthest away nodes from the root node, and give them as many slots as they need for sending all their messages. The parents of these nodes will have the assigned slots as receiving slots. Then, nodes at the next lower level can be considered. Because these nodes have to relay the messages of their descendants, in addition to their own messages, they can get as many sending slots as they need to transfer the messages of their descendants and their own ones. Again, the parents of these nodes will have these slots as receiving slots. The described assignment algorithm is repeated until the nodes at the first level are assigned with sending slots. Relaying nodes have to store all the messages they received from their descendants before they can send them to their parents.

According to an embodiment of the invention, an algorithm is proposed in the following steps, in which sending slots are given to a node as soon as the number of messages it has stored reaches a pre-defined threshold T:

In a first step, the procedure begins with populating the nodes with the number of messages they have at the beginning of the frame, namely node Ni with Mi messages.

In a second step, the whole network is explored starting from the root, e.g., by means of a breadth-first search, to find a node, which has at least T messages waiting for transfer.

In a third step, if such a node is found, slots are assigned to that node such that it can empty its message queue. Alternatively, that node can be given as many slots as needed for sending T messages. These slots can also be assigned to the node's parent as receiving slots. Further, the number of messages that can be sent during these slots is removed from the node found and added to the queue of its parent.

In a fourth step, if no node with at least T messages waiting can be found, the last node found with at least one message waiting is selected and the third step is applied to that node.

In a fifth step, the second to fourth steps are repeated until all messages are transferred to the root node.

In a further embodiment, the uptree frame request for activating the uptree frame is transmitted by a respective child node to its parent node within a slot in the collection frame assigned for the parent node. Thus, a transmission of the uptree frame request from the initially requesting node, the child node, can be provided to its parent node.

In a further embodiment, the uptree frame request for activating the uptree frame is relayed from an initially requesting node up to the root node. In such a case, all the nodes of the network being arranged on the path from the initially requesting node to the root node can be activated during this optional uptree frame.

In a further embodiment, the downtree and uptree frames are time-slotted. Alternatively, the downtree and uptree frames can be non-slotted.

In a further embodiment, the superframe is provided with the broadcast frame, at least one collection frame, a number of downtree frames and a number of uptree frames.

In a further embodiment, the superframe is provided with the broadcast frame, at least one collection frame, at least one downtree frame, at least one uptree frame, at least one listening frame and an empty frame. The listening frame can be used by un-synchronized nodes to exchange management messages with the sink node or root node. Un-synchronized nodes are those that either have lost the synchronization with their parents or do not have yet a parent, e.g. a node newly added to a running network. All synchronized nodes are in listening mode or receiving mode during this frame and forward messages received during this frame to the root node via their parents. To help un-synchronized nodes detecting the begin of the listening frame, all messages that are sent by synchronized nodes can contain an indication of when the next listening frame will begin. For example, a node newly added to the network can listen to the channel and decode all received messages to determine when the next listening frame begins. Then, during the listening frame, it can send, e.g. using CSMA, a management message, e.g. a request for joining the network, to one of its neighboring nodes. The neighboring node can forward this message to the root during one of its assigned sending slots, e.g. during the collection frame.

Examples for values for the duration of frames and slots are as follows:

superframe: 5 s to 10 min;
slot: 10 ms to 50 ms;
broadcast frame: as many slots as parent nodes in the network;
collection frame: depends on the topology of the network and the number of messages they have to send to the root node per superframe, typically 50 to 200 slots;
listening frame: 2 to 5 slots;
downtree frame: 2 to 5 slots; and
uptree frame: 5 to 100 slots.

According to an embodiment of another aspect of the invention, there is provided a multi-hop communication network with a Time Division Multiplex Access (TDMA) scheme, the multihop network including a plurality of nodes being hierarchically arranged in different levels, wherein the TDMA scheme of the communication network is organized by periodic superframes, the respective superframes having a number of frames including at least a broadcast frame, wherein the respective broadcast frame comprises a number of slots, the number of slots being equal to a number of parent nodes of the multi-hop network, wherein each parent node is assigned to one slot in the broadcast frame in dependence on its level, and wherein the broadcast frame is provided for distributing synchronization information to the parent nodes.

In the following, exemplary embodiments of the present invention are described with reference to the enclosed figures.

In this regard, FIG. 1 shows an embodiment of a sequence of method steps for synchronizing nodes of a TMDA-based multi-hop network. The method for FIG. 1 is discussed with reference to FIG. 2, which shows a diagram of an embodiment of a TMDA-based multi-hop network.

Figure 2:
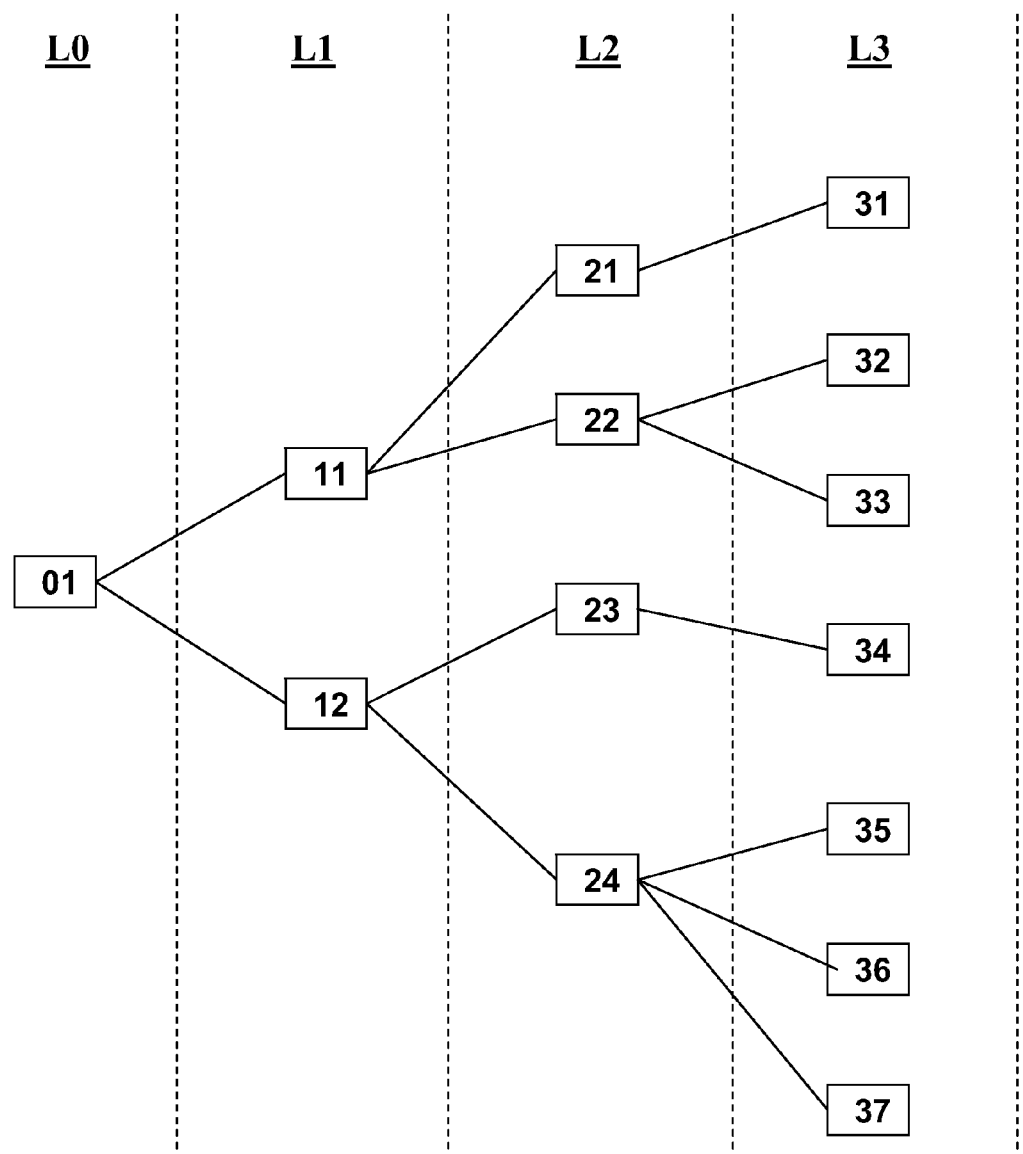
FIG. 2 shows a diagram of an embodiment of a TDMA-based multi-hop network.

With respect to FIG. 2, each node has a reference number comprising two characters. The first character shows the level of the respective node in the multi-hop network, wherein the root node has a "0" as a first character. The second character shows a consecutive number in the respective level. For example, in level L1, there is a first node indicated by 11 and a second node indicated by 12.

The routes towards the root node or sink node 01 form a tree with the sink node 01 as a root. In this regard, it is assumed that the tree construction is already performed. Further, the nodes 01 to 37 can be able to route messages based on source-routing information included in the message's header.

Thus, a message can be relayed, which is sent by the sink node to the destination node in the multi-hop network.

With respect to FIG. 1, the embodiment of the method has the following method steps 101-104.

In the step 101, the TMDA is organized by periodic superframes. The respective superframe has a number of frames including at least a broadcast frame.

Figure 3:
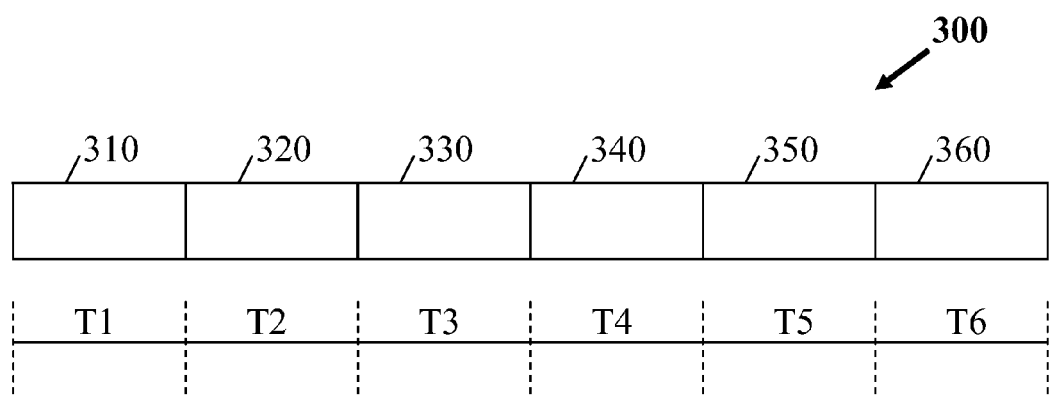
FIG. 3 shows a diagram of an embodiment of a superframe.

In this regard, FIG. 3 shows a diagram of an embodiment of a superframe 300.

The superframe 300 of FIG. 3 has a broadcast frame 310, a collection frame 320, a listening frame 330, a downtree frame 340, an uptree frame 350 and an empty frame 360. The broadcast frame 310 can be particularly arranged at the beginning of the superframe 300.

The downtree frame 340 can be activated in the case of receiving a downtree frame request. The downtree frame 340 can be configured to transmit at least one downtree message to at least one node in the multi-hop network. In particular, the downtree frame request can be transmitted to the child nodes by means of the assigned slots in the broadcast frame 310 such that one single branch of the multi-hop network is activated. Alternatively, the downtree frame request can be transmitted to the child nodes by means of the assigned slots in the broadcast frame 310 such that a plurality of branches of the multi-hop network is activated.

The uptree frame 350 can be activated in case of an uptree frame request in the multi-hop network. In particular, the uptree frame request can be transmitted to the child nodes by means of the assigned slots in the broadcast frame 310 such that one single branch of the multi-hop network is activated. Alternatively, the uptree frame request can be transmitted to the child nodes by means of the assigned slots in the broadcast frame 310 such that a plurality of branches of the multi-hop network is activated.

Furthermore, the collection frame 320 can be adapted to periodically transmit definite data to the root node 01. The periodically transmitted definite data can be sensor data. Furthermore, the uptree frame request for activating the uptree frame 350 can be transmitted by a respective child node to its parent node within a slot in the collection frame 320 assigned for the parent node. In this regard, the uptree frame request 350 can be relayed from an initially requesting node up to the root node 01.

Further, the listening frame 330 can be adapted to exchange management messages within synchronized nodes in the multi-hop network.

During the empty frame 360, or empty part of the superframe 300, the nodes 01 to 37 are in sleeping mode.

Furthermore, the different frames 310-360 of the superframe 300 can have different time durations T1-T6.

Figure 4:
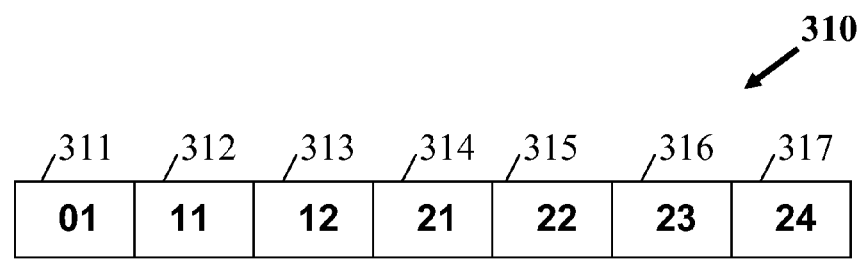
FIG. 4 shows a diagram of an embodiment of a broadcast frame of the superframe of FIG. 3.

In step 102 of FIG. 1 which is explained in more detail in FIG. 3 and FIG. 4, the respective broadcast frame 310 can be provided with a number of slots, the number of slots being equal to a number of parent nodes in the multi-hop network. For example, the multi-hop network of FIG. 2 has seven parent nodes, namely the nodes 01, 11, 12, 21, 22, 23, and 24. Thus, FIG. 4 shows a block diagram for an embodiment of a broadcast frame 310 of the superframe 300 of FIG. 3 including seven slots 311 to 317, because FIG. 2 shows said seven parent nodes.

In step 103 of FIG. 1 which is explained in more detail in FIG. 3 and FIG. 4, each parent node 01, 11, 12, 21, 22, 23, and 24 is assigned one slot 311 to 317 in the broadcast frame 310 in dependence on its level L0-L3. In FIG. 4, The slots 311-317 of the broadcast frame 310 are assigned to the nodes 01, 11, 12, 21, 22, 23, 24 depending on their levels L0-L3, with the first slot 311 assigned to the root node 01 followed by L1 nodes 11, 12, followed by L2 nodes 21, 22, 23 and 24.

In step 104 of FIG. 1 which is explained in more detail by FIG. 3 and FIG. 4, synchronization information is distributed to parent nodes 01-24, by means of the broadcast frame 310.

Figure 5:
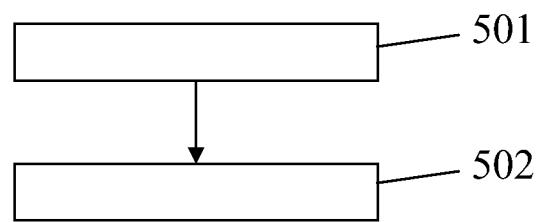
FIG. 5 shows an embodiment of a sequence of method steps for transmitting data to nodes of a TDMA-based multi-hop network.

Further, FIG. 5 shows an embodiment of a sequence of method steps for transmitting data to the nodes of a TDMA-based multi-hop network. In step 501, a TDMA-based network is provided, wherein the nodes are arranged in different levels. An embodiment for such a multi-hop network is shown in FIG. 2. In step 502, synchronization information is transmitted over the multi-hop network for synchronizing the nodes of the multi-hop network by means of a method as exemplary described with reference to FIG. 1.

Figure 6:
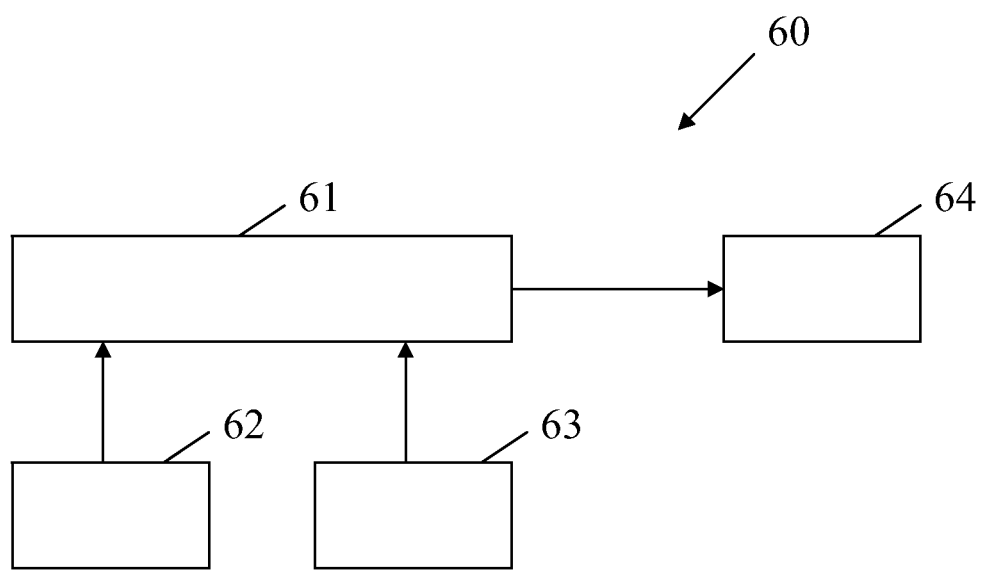
FIG. 6 shows a block diagram of a device for synchronizing nodes of a multi-hop network with a TDMA scheme.

In FIG. 6, a block diagram of a device 60 for synchronizing nodes 01-37 of a multi-hop network with a TDMA scheme is illustrated. The nodes 01-37 can be hierarchically arranged in different levels L0-L4, like exemplarily shown in FIG. 2. The device 60 of FIG. 6 comprises a scheduler 61, a provider 62, a processor 63, and a synchronizer 64. The provider 62 can be configured to provide the respective broadcast frame 310 with a number of slots 311-317 (see FIG. 4). The number of slots 311-317 can be equal to a number of parent nodes 01-24 in the multi-hop network (see FIG. 2). The processor 63 can be configured to assign each parent node 01-24 one slot 311-317 in the broadcast frame 310 in dependence on its level L0-L4.

Further, the provider 62 and processor 63 can be coupled to the scheduler 61. The scheduler 61 can be configured to organize the TDMA by periodic superframes 300. The respective superframe 300 can have a number of frames 310-360 including at least the broadcast frame 310 (see FIG. 3). The broadcast frame 310 provided by the provider 62 can be configured by the processor 63.

Furthermore, the scheduler 61 can be coupled to the synchronizer 64. The synchronizer 64 can be configured to distribute synchronization information to the parent nodes 01-24 by means of the broadcast frame 310, respectively.

All above-mentioned embodiments of the methods of the present invention can be embodied by respective means to be a respective embodiment of the device of the present invention.

What has been described herein is merely illustrative of the application of the principles of the present invention. Other arrangements and systems can be implemented by those skilled in the art without departing from the scope and spirit of this invention. Any disclosed embodiment can be combined with one or several of the other embodiments shown and/or described. This is also possible for one or more features of the embodiments.

The described techniques can be implemented as a method, apparatus or article of manufacture involving software, firmware, micro-code, hardware and/or any combination thereof. The term "article of manufacture" as used herein refers to code or logic implemented in a medium, where such medium can comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded can also comprise transmission signals propagating through space or a transmission media, such as an optical fiber, copper wire, etc. The transmission signal in which the code or logic is encoded can further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal can be decoded and stored in hardware or a computer readable medium at the receiving and transmitting stations or devices. Additionally, the "article of manufacture" can comprise a combination of hardware and software components in which the code is embodied, processed, and executed. Of course, those skilled in the art will recognize that many modifications can be made without departing from the scope of embodiments, and that the article of manufacture can comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, and microcode.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other can communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like can be described in a sequential order, such processes, methods and algorithms can be configured to work in alternate orders. In other words, any sequence or order of steps that can be described does not necessarily indicate a requirement that the steps be performed in that order. The steps of processes described herein can be performed in any order practical. Further, some steps can be performed simultaneously, in parallel, or concurrently.

When a single device or article is described herein, it will be apparent that more than one device/article (whether or not they cooperate) can be used in place of a single device/article. Similarly, where more than one device or article is described herein (whether or not they cooperate), it will be apparent that a single device/article can be used in place of the more than one device or article. The functionality and/or the features of a device can be alternatively embodied by one or more other devices which are not explicitly described as having such functionality/features. Thus, other embodiments need not include the device itself.

Computer program means, or computer program in the present context mean, any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for synchronizing nodes of a multi-hop network with a Time Division Multiplex Access (TDMA) scheme, the nodes being hierarchically arranged in different levels, the method comprising:
   organizing the TDMA scheme by periodic superframes, the respective superframe having a number of frames including at least a broadcast frame;
   providing the respective broadcast frame with a number of slots, the number of slots being equal to a number of parent nodes in the multi-hop network;
   assigning each parent node one slot in the broadcast frame in dependence on its level; and
   distributing synchronization information to the parent nodes by means of the broadcast frame.

2. The method as described in claim 1, wherein the multi-hop network is provided with one root node, at least one parent node being the parent of at least one child node arranged in the lower level than the parent node and at least one child node.

3. The method as described in claim 2, wherein a node having a level N is arranged N hops away from the root node, wherein each parent node is assigned its slot in the broadcast frame in dependence on its level N.

4. The method as described in claim 1, wherein the broadcast frame is arranged at the beginning of the superframe.

5. The method as described in claim 1, wherein each parent node is assigned its slot for re-distributing the synchronization information received from its parent node in the multi-hop network.

6. The method as described in claim 1, further comprising the step of transmitting synchronization information over the multi-hop network for synchronizing the nodes of the multi-hop network.

7. The method as described in claim 6, wherein at least one downtree message is transmitted within at least one slot of the broadcast frame additionally to the synchronization information.

8. The method as described in claim 7, wherein the downtree message and the synchronization information are transmitted by means of one single message in the respective slot of the broadcast frame.

9. The method as described in claim 7, wherein the downtree message and the synchronization information are transmitted by means of two separate messages in the respective slot of the broadcast frame.

10. The method as described in claim 7, wherein the at least one downtree message is broadcast to all nodes in the multi-hop network.

11. The method as described in claim 7, wherein at least one downtree message is unicasted to one defined receiver node or at least one downtree message is multi-casted to a definite number of receiver nodes, wherein said at least one downtree message is relayed by any intermediate node being arranged between said root node and the respective receiver node.

12. The method as described in claim 7, wherein the superframe is additionally provided with a downtree frame in case of a downtree frame request for activating said downtree frame, wherein the downtree frame is configured to transmit at least one downtree message to at least one receiver node in the multi-hop network.

13. The method as described in claim 12, wherein the downtree frame request for activating the downtree frame is transmitted to the child nodes by means of the assigned slots in the broadcast frame such that one single branch of the multi-hop network is activated.

14. The method as described in claim 12, wherein the downtree frame request for activating the downtree frame is transmitted to the child nodes by means of the assigned slots in the broadcast frame such that a plurality of branches of the multi-hop network is activated.

15. The method as described in claim 7, wherein the superframe is additionally provided with an uptree frame in case of an uptree frame request for activating said uptree frame.

16. The method as described in claim 15, wherein the uptree frame request for activating the uptree frame is transmitted to the child nodes by means of the assigned slots in the broadcast frame such that one single branch of the multi-hop network is activated.

17. The method as described in claim 15, wherein the uptree frame request for activating the uptree frame is transmitted to the child nodes by means of the assigned slots in the broadcast frame such that a plurality of branches of the multi-hop network is activated.

18. The method as described in claim 15, wherein the superframe is additionally provided with a collection frame, said collection frame being configured to periodically transmit definite data to the root node.

19. The method as described in claim 18, wherein the uptree frame request for activating said uptree frame is transmitted by a respective child node to its parent node within a slot in the collection frame assigned for the parent node.

20. The method as described in claim 18, wherein the uptree frame request for activating said uptree frame is relayed from an initially requesting node up to the root node.

21. The method as described in claim 7, wherein the superframe is provided with the broadcast frame, at least one collection frame, a number of downtree frames and a number of uptree frames.

22. The method as described in claim 7, wherein the superframe is provided with the broadcast frame, at least one collection frame, at least one downtree frame, at least one uptree frame, at least one listening frame and an empty frame.

23. A non-transitory computer readable storage medium tangibly embodying a computer readable program code having computer readable instructions which, when implemented, cause a computer to carry out the steps of a method comprising;
 organizing the TDMA scheme by periodic superframes, the respective superframe having a number of frames including at least a broadcast frame;
 providing the respective broadcast frame with a number of slots, the number of slots being equal to a number of parent nodes in the multi-hop network;
 assigning each parent node one slot in the broadcast frame in dependence on its level; and
 distributing synchronization information to the parent nodes by means of the broadcast frame.

24. A device for synchronizing nodes of a multi-hop network with a Time Division Multiplex Access (TDMA) scheme, the nodes being hierarchically arranged in different levels, the device comprising:
 a scheduler for organizing the TDMA by periodic superframes, the respective superframe having a number of frames including at least a broadcast frame,
 a provider for providing the respective broadcast frame with a number of slots, the number of slots being equal to a number of parent nodes in the multi-hop network,
 a processor for assigning each parent node one slot in the broadcast frame in dependence on its level, and
 a synchronizer for respectively distributing synchronization information to the parent nodes by means of the broadcast frame.

* * * * *